Nov. 14, 1950 A. L. GRISÉ 2,529,936
AUTOMATIC SAFETY SHUTOFF VALVE FOR HOSE NOZZLES
Filed Aug. 22, 1946
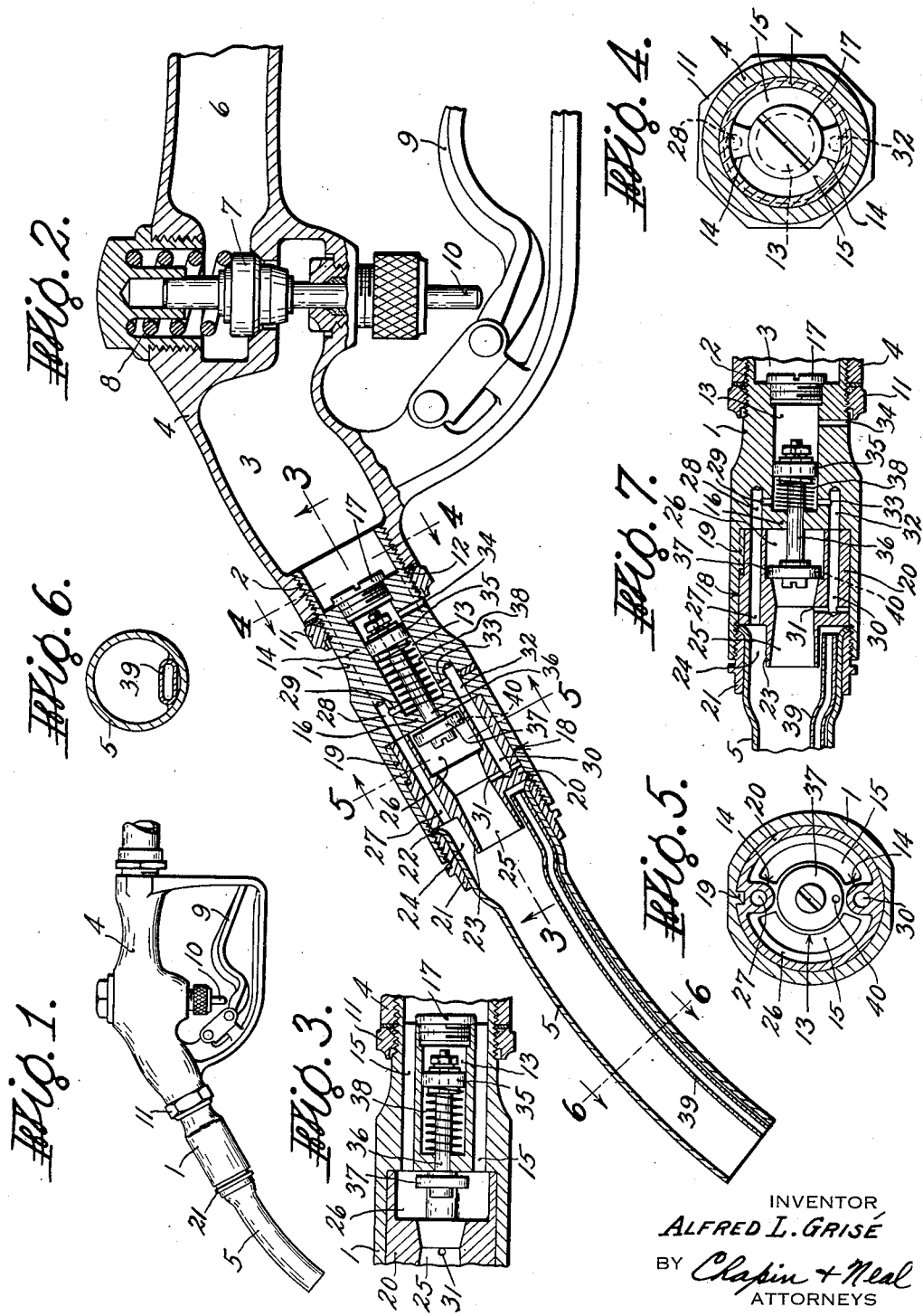
INVENTOR
ALFRED L. GRISÉ
BY Chapin + Neal
ATTORNEYS Patented Nov. 14, 1950

2,529,936

UNITED STATES PATENT OFFICE 2,529,936

AUTOMATIC SAFETY SHUTOFF VALVE FOR HOSE NOZZLES

Alfred L. Grisé, Springfield, Mass., assignor to Gilbert & Barker Manufacturing Company, West Springfield, Mass., a corporation of Massachusetts Application August 22, 1946, Serial No. 692,213

1 Claim. (Cl. 226—127)

This invention relates to an improved automatic safety shut-off valve for hose nozzles. The invention has one important use in connection with the hose nozzle of a gasoline dispensing apparatus for automatically stopping the flow from the hose nozzle when the tank, being serviced, becomes full.

The invention has to do with an automatic shut-off valve, which is actuated to closed position by suction caused by flow of the dispensed liquid through a venturi and produced in the cylinder or other chamber of a pneumatic valve-actuating means and in which such means is prevented from operating to close the valve by a vent extending from said cylinder to the delivery end of the spout of the nozzle, whereby when the liquid in the tank being serviced rises sufficiently, the vent will be closed and the valve-actuating pneumatic means will be rendered operative to actuate the valve to closed position.

The invention has for an object the provision in an automatic safety shut-off valve for hose nozzles of a casing made up of liquid-conducting outer and inner sections with the inner section telescoped in the outer section, together with a delivery spout in part telescoped in the outer section, and a single means for holding the spout and inner section together and to the outer section—the inner section having a venturi through which liquid is adapted to flow, the outer section having pneumatic means for operating a valve from the suction effect of the flow through the venturi for the purpose of stopping flow through the latter, and the spout and both sections having communicating passages for venting the pneumatic means until the inlet of the venting passage in the spout is closed by rising liquid in the tank being serviced.

The invention has for a further object the provision in a device of the class described of an arrangement of the venting passages such that one of them consists of a tube fixed solely to the spout and operatively communicating with a passage in the inner casing section without being fixed to such section.

The invention has for a further object the provision in a device of the class described of simplified and improved structure adapting the device for manufacture by quantity production methods with substantial economies resulting in low unit cost and resulting also in a better article less likely to require servicing and readily accessible for servicing when required.

The invention will be disclosed with reference to the accompanying drawings in which—

Fig. 1 is a small scale exterior elevational view showing the automatic shut-off valve applied to a valved hose nozzle;

Fig. 2 is a sectional elevational view thereof drawn to a larger scale and showing the automatic shut-off valve in open position;

Fig. 3 is a fragmentary sectional view taken on the line 3—3 of Fig. 2;

Figs. 4, 5, and 6 are cross-sectional views taken on the lines 4—4, 5—5 and 6—6, respectively of Fig. 2; and Fig. 7 is a fragmentary sectional view taken similarly to Fig. 2 but showing the automatic shut-off valve in closed position.

Referring to these drawings; the automatic shut-off valve includes a casing (Fig. 2) having an outer section 1, the inlet end of which is adapted, as by the screw threads 2, for connection to the outlet 3 of the body 4 of a hose nozzle and the outlet end of which has a spout 5 through which the liquid is delivered. The hose nozzle may be such as is customarily used with gasoline measuring and dispensing apparatus and has an inlet 6 adapted for connection to the hose of such apparatus, a valve 7 for controlling communication between inlet 6 and outlet 3, a spring 8 tending to hold valve 7 closed, and a handle 9 for manually opening valve 6 by inward pressure on the valve stem 10. Nozzles of this kind usually have a spout fastened directly to outlet 3. To adapt such nozzles for this invention the usual spout is removed and casing 1 is screwed into the interiorly threaded end of outlet 3 and held thereto by the usual lock nut 11 and the joint sealed by the packing 12. A new spout 5, with special provisions to be described, is provided on the casing 1. Existing hose nozzles can thus be converted into nozzles with the automatic shut-off valve, by simply removing the old spout from each nozzle and substituting the casing 1 and spout 5 of this invention.

The section 1 is of generally cylindrical form. It has within it the pneumatic or suction-operated means for closing the shut-off valve. Such means, as herein shown, consists of a cylinder 13, which is located in and coaxially of the section and extends longitudinally from the inlet end to about the mid-point of the casing. The wall of this cylinder is supported by diametrically opposed webs 14 (Figs. 4 and 5) from the interior wall of the casing, leaving two passages 15 for the passage of liquid past the cylinder. This cylinder has an integral head 16 (Fig. 2) at one end and at the other end a removable head in the form of a screw 17, threaded into the cylinder. The casing 1 at its other end is formed with a recess or socket 18, which is cylindrical, except for a short inwardly projecting key 19 (see also Fig. 5), and the base of the socket is a plane surface at right angles to the axis thereof and in this plane lies the outer face of cylinder head 16. This socket 18 receives an inner casing section 20 which has an outer cylindrical surface and a square inner end face to abut the base of the socket 18 and a keyway to receive key 19. The outer end of the recess is screw threaded to receive an annular nut 21, which surrounds the inlet end of spout 5 and the inner end of which presses against the out-turned flange 22 of the spout, forcing the same inwardly and pressing the member 20 against the base wall of socket 18. The one nut thus serves to hold together the spout 5 and the two sections 1 and 20 of the casing.

The member 20 is provided with a forwardly-projecting cylindrical nozzle 23 of smaller diameter, forming an annular space 24 between it and the interior wall of spout 5. The member 20 further is provided with a coaxial Venturi passage 25, extending from the front face of nozzle 23, through the latter and into the body of the member, communicating at its rear end with a coaxial chamber 26 of larger diameter which extends to the rear end face of member 20 and into which the arcuate passages 15 open, as shown in Figs. 3 and 5, for delivery of liquid to the venturi. There is a vent passage 27 which extends entirely through member 20 parallel to the axis thereof and which opens at one end to the annular space 24 and at the other end communicates with a passage 28 which in turn extends part way into one of the webs 14 and is connected by a radial passage 29 to the interior of cylinder 13 near the head 16. Parallel with and located diametrically of the vent passage 27 is a passage 30, which extends from the rear end of member 20 forwardly toward, but not quite to, the front face of the member and which communicates by means of a radial passage 31 with the throat of the venturi 25. The rear end of passage 30 communicates with a passage 32 which extends part way into the other web 14 and has its inner end connected by a radial passage 33 to the interior of cylinder 13 near the head 16. Extending radially through the last-named web is a vent hole 34 which inter connects the rear end of cylinder 13 (near head 17) with the atmosphere.

Within the cylinder 13 is a piston 35, the piston rod 36 of which passes through the head 16 and has fixed to its outer end a valve 37, located within the chamber 26. A spring 38, located within cylinder 13 and surrounding rod 36, acts between head 16 and the adjacent face of the piston 35 with a tendency to hold the latter and valve 37 in the opening position, shown in Fig. 2. The valve is moved to the closed position shown in Fig. 7, in which it closes the entrance of the venturi, by means of the suction effect created in the cylinder 13 by the rush of liquid through the venturi. A partial vacuum is created in the cylinder to the left of piston 13 by suction through the passages 33, 32, 30 and 31, whereby atmospheric pressure in the cylinder to the right of the piston forces the latter to the left until the valve engages its seat on member 20. While suction is applied to cylinder 13 continuously while liquid flows through the venturi, it is prevented from closing valve 37 because of the vent provided by the passages 27, 28 and 29 and a tube 39 which connects the annular space 24 to the outlet end of spout 5. This tube is soldered to the spout and preferably is of the flattened down form shown in Fig. 6. As long as air is free to enter tube 39, the valve 37 will remain open. It is not necessary that the outlet end of tube 39 directly connect with passage 27. The connection by way of the annular space 24 will suffice because this space does not normally fill with liquid. When the liquid in the fill pipe of the tank being serviced rises far enough to cover the inlet end of tube 39, the valve 37 closes almost instantaneously and stops the flow from the spout 5. The closing will be manifested to the operator by a slight clicking noise whereupon he will close the valve 7 in the hose nozzle body and withdraw spout 5 from the fill pipe. Cylinder 13 will then be vented to the atmosphere on both sides of the piston so that spring 38 will open valve 37. A small bleed hole 40 through this valve serves to relieve the pressure of the liquid which is trapped between the hand valve 7 and the automatic valve 37 and enables a quick opening of the latter valve.

The members 1 and 20 are shaped to be manufactured by die casting and can be produced in quantities at low unit cost. The member 1 can have the cylinder 13, the hole in head 16 for piston rod 36, the two passages 15, the passages 28 and 32, the recess 18 and key 19 formed during the die casting operation. The only machining necessary is to thread the inlet and outlet ends of the casing, to thread cylinder 13 to receive the head-forming screw 17, and to drill the small radial passages 29, 33 and 34 and plug the outer ends of passages 29 and 33. The member 20 with its venturi 25, chamber 26, and passages 27 and 30 may also be formed by die casting leaving nothing to be done except to drill the small radial passage 31. The spout is formed from drawn tubing and the vent tube 39 can be fastened to it prior to assembly of the tube in the casing because it is not necessary to attach the tube to the member 20. The piston, its rod and valve 37 are simple and inexpensive to make. Thus, the construction of the automatic shut-off device is such as to adapt it for manufacture by quantity production methods at low unit cost.

The invention provides an arrangement of parts capable of assembly quickly, easily and conveniently. The arrangement is also such that the device may be readily taken apart if and when required for servicing, although the construction is such that servicing is not likely to be needed often. In particular, the spout 5 may be removed as readily as any hose nozzle spout because the vent tube 39 is fastened only to the spout and does not need to be fixed to any other part of the casing.

The invention also provides a device which can readily be applied to existing hose nozzles to convert them into the automatic shut-off type. One simply removes the old spout of each hose nozzle and replaces it with the casing and spout of this invention, which may be done quickly and conveniently.

I claim:

An automatic safety shut-off valve for hose nozzles, comprising, a first casing section having an inlet end adapted for connection to the outlet of a hose nozzle and having an inlet opening therein, said section having in its other end thereof a socket with a cylindrical wall and a flat base wall normal to the axis of the cylindrical wall, a cylinder located coaxially of said socket and extending from the base of the socket toward said inlet opening, the outer head of said cylinder being formed by part of the base of said socket, a piston in said cylinder, a rod fixed to the piston and extending through said outer head into the socket, a valve fixed to said rod and located in said socket, a spring in the cylinder around the rod for moving the piston toward said inlet end and said valve against the base of the socket, an inner head for the cylinder accessible from said inlet opening, said first section having supporting ribs for said cylinder extending from the inlet opening to and opening into the base of said socket, and two relatively large passages of arc-shaped cross section located between said ribs, said first section also having two relatively small passages one in each said rib and each connecting at one end to the outer end of the cylinder and at the other end opening into the base of said socket, a second casing section having a cylindrical wall engaged with the cylindrical wall of said socket and a flat inner end face abutting the flat base of the socket, said second casing having in its inner end face a chamber closed at one end by the base of the socket and housing said valve and encompassing the open ends of both said arc-shaped passages in said base, said second section having coaxially thereof a Venturi passage extending from the valve chamber to its outer end and two relatively small passages connecting at one end one with each of the first-named small passages and extending one to the throat of the Venturi passage and the other to the outer end of the second section, interengaging tongue and groove means on the engaged cylindrical surfaces of the first and second sections to insure registration of the respective passages therein, a spout having an outturned flange inserted into the outer end of the socket, an annular nut threaded into the outer end of said socket for pressing said flange against the outer end face of the second section and the latter against the base of the socket, and a vent conduit extending through said spout from the outlet end of the latter to the outer end of said second casing section.

ALFRED L. GRISE.

REFERENCES CITED

The following references are of record in the file of this patent:

UNITED STATES PATENTS

| Number | Name | Date |
| --- | --- | --- |
| 2,111,851 | Flinchbaugh | Mar. 22, 1938 |
| 2,244,947 | Hargiss | June 10, 1941 |
| 2,310,631 | Hensen | Feb. 9, 1943 |
| 2,330,704 | Grisé | Sept. 28, 1943 |
| 2,445,524 | Grisé | July 20, 1948 |